US011662860B2

(12) United States Patent
Mochizuki (10) Patent No.: US 11,662,860 B2
(45) Date of Patent: May 30, 2023

(54) REFERENCE POSITION SETTING METHOD AND OPERATION DETECTION DEVICE FOR DISPLAYING AN OPERATION SURFACE AS A VIRTUAL IMAGE

(71) Applicant: MURAKAMI CORPORATION, Shizuoka (JP)

(72) Inventor: Takayoshi Mochizuki, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 9 days.

(21) Appl. No.: 17/601,562

(22) PCT Filed: Mar. 2, 2020

(86) PCT No.: PCT/JP2020/008769
§ 371 (c)(1),
(2) Date: Oct. 5, 2021

(87) PCT Pub. No.: WO2020/208974
PCT Pub. Date: Oct. 15, 2020

(65) Prior Publication Data
US 2022/0206629 A1 Jun. 30, 2022

(30) Foreign Application Priority Data

Apr. 10, 2019 (JP) .............................. JP2019-074783

(51) Int. Cl.
*G06F 3/042* (2006.01)
*G06F 3/0346* (2013.01)
(52) U.S. Cl.
CPC .......... *G06F 3/0425* (2013.01); *G06F 3/0346* (2013.01); *G06F 2203/04101* (2013.01)
(58) Field of Classification Search
CPC ................. G06F 3/0425; G06F 3/0346; G06F 2203/04101; G06F 3/017; G06F 3/0308;
(Continued)

(56) References Cited

U.S. PATENT DOCUMENTS

2014/0253511 A1 9/2014 Yagishita
2018/0081495 A1* 3/2018 Kamamori ............ G06F 3/0425

FOREIGN PATENT DOCUMENTS

JP 2000-330709 11/2000
JP 2011-253255 12/2011
(Continued)

OTHER PUBLICATIONS

International Search Report issued in International Patent Application No. PCT/JP2020/008769, dated May 12, 2020, along with an English translation thereof.
(Continued)

*Primary Examiner* — David D Davis
(74) *Attorney, Agent, or Firm* — Greenblum & Bernstein, P.L.C.

(57) ABSTRACT

A reference position setting method includes: a process of displaying at least three markers on an operation surface; a process of acquiring coordinate values of a sensor coordinate system; a process of transforming the acquired coordinate value into coordinate values of a temporary coordinate system; and a process of transforming the transformed coordinate values into coordinate values of a screen coordinate system. At least one of parallel movement and rotation is performed with respect to the sensor coordinate system to transform the sensor coordinate system into the temporary coordinate system. Movement of the temporary coordinate system in a direction parallel to a plane including a second X-axis and a second Y-axis, and enlargement or reduction of the temporary coordinate system are performed to transform the temporary coordinate system into the screen coordinate system.

4 Claims, 7 Drawing Sheets

(58) Field of Classification Search
CPC .. G06F 3/0383; G06F 3/0418; G06F 3/03547; B60K 2370/1434; B60K 2370/21; B60K 35/00; B60K 37/06
See application file for complete search history.

(56) References Cited

FOREIGN PATENT DOCUMENTS

| | | | |
|---|---|---|---|
| JP | 2011253255 A | * | 12/2011 |
| JP | 4865088 | | 2/2012 |
| JP | 2014-170511 | | 9/2014 |
| JP | 2018-173987 | | 11/2018 |
| WO | 2009/131128 | | 10/2009 |

OTHER PUBLICATIONS

English language translation of International Preliminary Report on Patentability in International Patent Application No. PCT/JP2020/008769, dated Oct. 21, 2021.

* cited by examiner

REFERENCE POSITION SETTING METHOD AND OPERATION DETECTION DEVICE FOR DISPLAYING AN OPERATION SURFACE AS A VIRTUAL IMAGE

TECHNICAL FIELD

The present disclosure relates to a reference position setting method and an operation detection device of setting a reference position for detecting an operation.

BACKGROUND ART

Patent Literature 1 discloses a spatial coordinate input device that inputs coordinates in an actual space in which a virtual object is displayed. In the spatial coordinate input device, a screen to which an image for three-dimensionally displaying the virtual object is projected is provided in front of an operator, a magnetic field generating device that generates a magnetic field is provided behind the operator, and a position input device including a tip end portion configured to detect the magnetic field is held by the operator. The position input device is a device that inputs spatial coordinates at which the magnetic field is detected at the tip end portion to a control device. An optical measurement device including three TV cameras is provided around the operator.

In the above-described spatial coordinate input device, a corresponding relationship between the spatial coordinates input to the control device by the position input device and actual coordinates in the actual space is corrected by performing optical measurement using the optical measurement device. Specifically a grid plate in which a transparent plate is provided with scales with regular intervals is provided in the actual space. In addition, a pointer including a mark for image detection indicates a plurality of points on the grid plate, and the tip end portion of the position input device is disposed at the mark of the pointer. Then, the three TV cameras of the optical measurement device image the pointer to obtain a spatial coordinate value (that is, an optical coordinate value) indicating a position of the mark of the pointer. In addition, the tip end portion of the position input device detects a magnetic field to input a spatial coordinate value (that is, a magnetic coordinate value) indicating a position of the mark of the pointer to the control device. Then, the spatial coordinate input device obtains a 4×4 matrix for transforming the magnetic coordinate value to an optical coordinate value, and the magnetic coordinate value is transformed to the optical coordinate value by using the obtained matrix.

CITATION LIST

Patent Literature

Patent Literature 1: Japanese Unexamined Patent Publication No. 2000-330709

SUMMARY OF INVENTION

Technical Problem

In the above-described spatial coordinate input device, calibration using the optical measurement device is performed as an operation for correcting a corresponding relationship between the spatial coordinates input to the control device by the position input device and the actual coordinates in the actual space. However, in order to perform calibration, it is necessary for the spatial coordinate input device to be provided with a large-scaled instrument including the grid plate provided in the actual space, and the optical measurement device including three TV cameras configured to detect the mark of the pointer that points a site on the grid plate.

The present disclosure is to provide a reference position setting method and an operation detection device which are not necessary to be provided with a large-scaled instrument for performing calibration and are capable of simplifying a device configuration.

Solution to Problem

A reference position setting method according to an aspect of the present disclosure is a reference position setting method of setting a reference position for detecting an operation on an operation surface displayed as a virtual image. The reference position setting method includes: a process of displaying at least three markers on the operation surface in such a manner that the at least three markers form vertices of a triangle; a process of acquiring coordinate values of the markers in a sensor coordinate system including a first Z-axis extending from a sensor toward the operation surface, and a first X-axis and a first Y-axis intersecting the first Z-axis, by the sensor detecting a target approaching the marker; a process of transforming the coordinate values acquired in the acquisition process into coordinate values in a temporary coordinate system including a second X-axis and a second Y-axis intersecting each other on a plane parallel to the operation surface; and a process of transforming the coordinate values transformed in the transformation process into coordinate values in a screen coordinate system including a third X-axis and a third Y-axis extending in directions parallel to the second X-axis and the second Y-axis on the operation surface, respectively. In the transformation process into the coordinate values in the temporary coordinate system, at least one of parallel movement and rotation is performed with respect to the sensor coordinate system to transform the sensor coordinate system into the temporary coordinate system. In the transformation process into the coordinate value in the screen coordinate system, movement of the temporary coordinate system in a direction parallel to a plane including the second X-axis and the second Y-axis, and enlargement or reduction of the temporary coordinate system are performed to transform the temporary coordinate system into the screen coordinate system.

An operation detection device according to the present disclosure is an operation detection device configured to set a reference position for detecting an operation on an operation surface displayed as a virtual image. The operation detection device includes: a display unit configured to display at least three markers on the operation surface in such a manner that the at least three markers form vertices of a triangle; a sensor configured to acquire coordinate values of the markers in a sensor coordinate system including a first Z-axis extending toward the operation surface, and a first X-axis and a first Y-axis intersecting the first Z-axis, by detecting a target approaching the markers; a first coordinate transformation unit configured to transform coordinate values of the markers in the sensor coordinate system into coordinate values in a temporary coordinate system including a second X-axis and a second Y-axis intersecting each other on a plane parallel to the operation surface; and a second coordinate transformation unit configured to transform the coordinate values of the markers in the temporary coordinate system into coordinate values in a screen coordinate system including a third X-axis and a third Y-axis extending in directions parallel to the second X-axis and the second Y-axis on the operation surface, respectively. The first coordinate transformation unit performs at least one of parallel movement and rotation with respect to the sensor coordinate system to transform the sensor coordinate system into the temporary coordinate system. The second coordinate transformation unit performs movement of the temporary coordinate system in a direction parallel to a plane including the second X-axis and the second Y-axis, and enlargement or reduction of the temporary coordinate system to transform the temporary coordinate system into the screen coordinate system.

In the reference position setting method and the operation detection device as described above, at least three markers for setting the reference position are displayed on the operation surface as a virtual image. The sensor acquires coordinate values of the markers in the sensor coordinate system by detecting a target approaching the markers displayed on the operation surface. The coordinate values in the sensor coordinate system are transformed into coordinate values in the temporary coordinate system, and then transformed into coordinate values in the screen coordinate system including the third X-axis and the third Y-axis located on the operation surface. Here, even when directly transforming the coordinate values of the markers in the sensor coordinate system displayed on the operation surface into the coordinate values in the screen coordinate system, conditions for obtaining a transformation coefficient matrix required for coordinate system transformation are insufficient, and thus it is difficult to directly transform the sensor coordinate system into the screen coordinate system. In the reference position setting method and the operation detection device as described above, at least one of parallel movement and rotation is performed with respect to the sensor coordinate system to transform the sensor coordinate system into the temporary coordinate system. In addition, movement of the temporary coordinate system in a direction parallel to a plane including the second X-axis and the second Y-axis, and enlargement or reduction of the temporary coordinate system are performed to transform the temporary coordinate system into the screen coordinate system. In this manner, the process of transforming the sensor coordinate system into the temporary coordinate system, and the process of transforming the temporary coordinate system into the screen coordinate system include processing of performing rotation of the coordinate system, and processing of performing enlargement or reduction of the coordinate system, respectively. According to this, conditions for obtaining the transformation coefficient matrix required for the coordinate system transformation can be satisfied, and transformation from the sensor coordinate system into the temporary coordinate system, and transformation from the temporary coordinate system into the screen coordinate system can be performed, respectively. As a result, the coordinate values of the markers in the screen coordinate system are obtained from the coordinate values of the markers in the sensor coordinate system, and thus another measurement instrument for actually measuring the coordinate values of the markers in the screen coordinate system is not necessary when performing calibration for setting the reference position. According to this, a configuration of the apparatus can be simplified. If actually measuring the coordinate values in the screen coordinate system by using another measurement instrument, a positional relationship of the markers may be distorted before and after the coordinate system transformation due to a measurement error of the measurement instrument or the like. According to the reference position setting method and the operation detection device as described above, since the coordinate values of the marker in the screen coordinate system are obtained from the coordinate values of the markers in the sensor coordinate system, the positional relationship of the markers before and after the coordinate system transformation is not distorted. That is, the transformation coefficient matrix required for the coordinate system transformation can be obtained with accuracy. Accordingly, the coordinate values of the markers in the sensor coordinate system can be transformed into the coordinate values in the screen coordinate system with accuracy, and calibration can be performed with accuracy.

In the transformation process into the coordinate value in the temporary coordinate system, a coordinate value of one marker among the at least three markers in the sensor coordinate system may be set as the origin of the temporary coordinate system. In this case, components of the coordinate value of the one marker in the temporary coordinate system become zero. According to this, a processing load in accordance with transformation from the sensor coordinate system into the temporary coordinate system, and a processing load in accordance with transformation from the temporary coordinate system into the screen coordinate system can be reduced, respectively.

In the transformation process into the coordinate values in the temporary coordinate system, a coordinate value of one marker among the at least three markers in the sensor coordinate system may be set as a coordinate value on the second X-axis of the temporary coordinate system, and a coordinate value of another one marker among the at least three markers in the sensor coordinate system may be set as a coordinate value on the second Y-axis of the temporary coordinate system. In this case, a component of the second Y-axis of the coordinate value of the one marker in the temporary coordinate system becomes zero, in addition, a component of the second X-axis of the coordinate value of the other one marker in the temporary coordinate system becomes zero. According to this, a processing load in accordance with transformation from the sensor coordinate system into the temporary coordinate system, and a processing load in accordance with transformation from the temporary coordinate system into the screen coordinate system can be reduced, respectively.

Advantageous Effects of Invention

According to the present disclosure, a large-scaled instrument for executing calibration is not necessary, and a device configuration can be simplified.

DESCRIPTION OF EMBODIMENTS

Hereinafter, embodiments of a reference position setting method and an operation detection device according to the present disclosure will be described with reference to the accompanying drawings. In description of the drawings, the same reference numeral will be given to the same or equivalent element, and redundant description will be appropriately omitted. The drawings are partially simplified or exaggerated for easy understanding, and dimension ratios and the like are not limited to description in the drawings.

In this embodiment, "target" is a target detected by a sensor, and operates an operation surface to cause a device to operate. For example, the "target" is a rod-shaped object such as a users finger. "Operation surface" represents a surface capable of causing a device to operate. For example, the "operation surface" is a plane on which a button such as a switch is displayed as a virtual image. "Sensor" is a sensor that detects operation on an operation unit by the target. "Reference position" is a position that becomes a reference for recognizing whether or not the operation surface is operated. For example, the "reference position" is a predetermined position with respect to the operation surface displayed as a virtual image. The predetermined position may be a position immediately above the operation surface displayed as a virtual image, or may be a position spaced apart from the operation surface by a predetermined distance.

Figure 1:
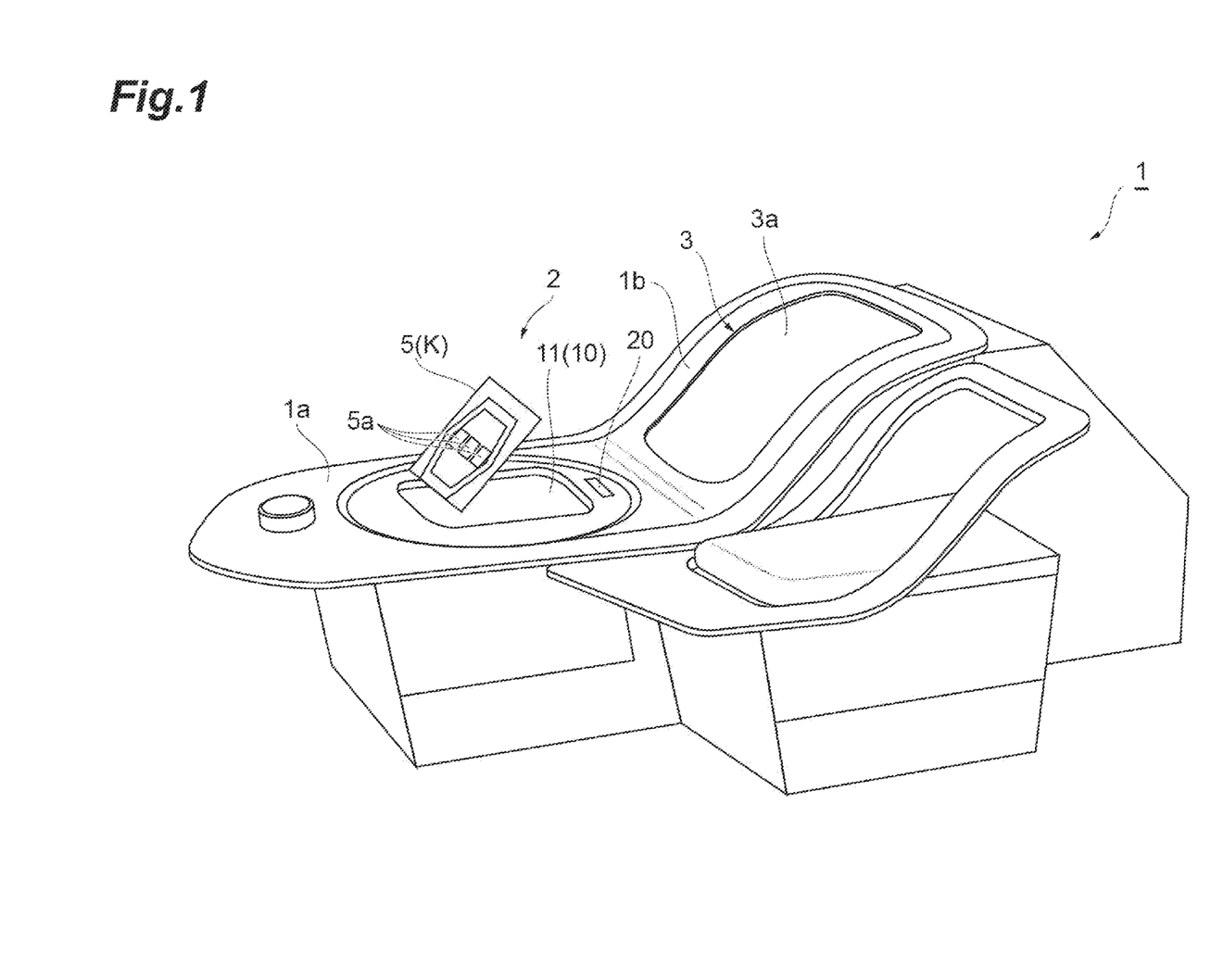
FIG. 1 is a perspective view illustrating a display apparatus including an operation detection device according to an embodiment.

FIG. 1 is a perspective view illustrating a display apparatus 1 including an operation detection device 2 according to this embodiment. The display apparatus 1 constructs a human machine interface (HMI) between a vehicle and a passenger of the vehicle. For example, the display apparatus 1 is installed at the central portion in a right and left direction of the vehicle. As illustrated in FIG. 1, the display apparatus 1 includes the operation detection device 2 that is provided on a rear side of the display apparatus 1 in a front and rear direction of the vehicle, and an image display device 3 that is provided on a front side of the display apparatus 1 in the front and rear direction of the vehicle. For example, the operation detection device 2 is provided at a flat portion 1a of the display apparatus 1, and the image display device 3 is provided at an inclined portion 1b of the display apparatus 1. The flat portion 1a is a portion that extends in both the front and rear direction and a right and left direction of the vehicle in the display apparatus 1. The inclined portion 1b is a portion that extends diagonally upward from a front side of the flat portion 1a.

For example, the operation detection device 2 displays an operation surface 5 for causing respective devices (for example, an in-vehicle back camera or an air conditioner) mounted in the vehicle to operate as a virtual image K. The operation detection device 2 includes a sensor 20 that detects a target F (refer to FIG. 2) that approaches the operation surface 5. For example, the operation surface 5 is a rectangular operation plane including a plurality of buttons 5a capable of operating the in-vehicle back camera. The "operation plane" represents a planar user interface capable of operating devices. When the sensor 20 detects the target F, the operation detection device 2 detects an operation by the target F on the operation surface 5 on the basis of a position of the target F detected by the sensor 20. The operation detection device 2 causes respective devices to operate on the basis of the detected operation. According to the operation detection device 2, operations of the devices become possible due to approaching of the target F toward the operation surface 5 displayed as the virtual image K, and thus physical buttons and the like are not necessary.

In this embodiment, meaning of "approaching" includes both a case where an arbitrary object comes into contact with another object, and a case where an arbitrary object is close another object up to a predetermined distance. Examples of the operation include a pressing operation, a tapping operation, and a sliding operation against the operation surface 5 by the target F, but the kind of the operation is not particularly limited. In this embodiment, as an operation on the operation surface 5, the pressing operation on the buttons 5a is exemplified. The pressing operation includes both an operation of pressing down the buttons 5a on the operation surface 5, and an operation of pushing up the buttons 5a on the operation surface 5.

For example, the image display device 3 includes a display 3a that displays at least any one of vehicle information, road information, and degree-of-danger information. The information displayed by the operation detection device 2 and the image display device 3 may be read aloud by voice output from a voice output unit (not illustrated) provided in the display apparatus 1. When the voice output from the voice output unit is associated with display by the operation detection device 2 and the image display device 3, it is possible to provide more reliable information in a visible and audible manner.

Figure 2:
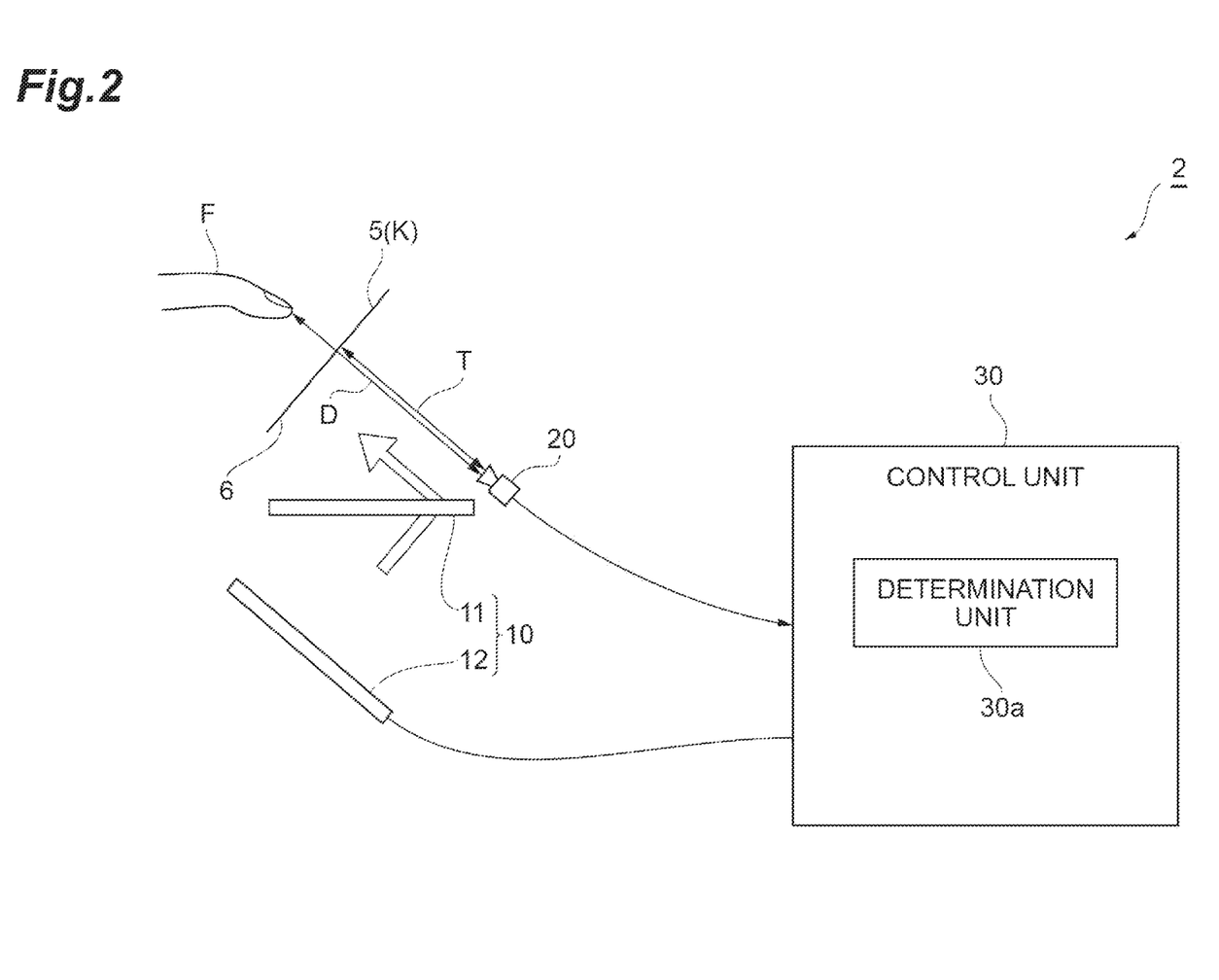
FIG. 2 is a schematic configuration diagram illustrating the operation detection device in FIG. 1.

FIG. 2 is a schematic configuration diagram illustrating the operation detection device 2. As illustrated in FIG. 2, the operation detection device 2 includes a display unit 10, the sensor 20, and a control unit 30. The display unit 10 displays the operation surface 5 in the air as the virtual image K. The display unit 10 includes an aerial imaging (AI) plate (registered trademark) 11 that is an aerial imaging element, and a liquid crystal panel 12. For example, the AI plate 11 is manufactured by using a technology described in Japanese Patent No. 4865088.

For example, the liquid crystal panel 12 is a display of a personal computer (PC), a tablet terminal, and a portable terminal such as a portable telephone. The liquid crystal panel 12 displays an image on the basis of a signal output from the control unit 30. The AI plate 11 is diagonally inclined with respect to the liquid crystal panel 12. The image displayed by the liquid crystal panel 12 is displayed as the virtual image K at a position on a user (target F) side with respect to the AI plate 11 and the liquid crystal panel 12 by the AI plate 11. An inclination angle of the AI plate 11 with respect to the liquid crystal panel 12 may be variable.

For example, the sensor 20 is a depth sensor, and is provided on a side opposite to the target F with the operation surface 5 interposed therebetween. For example, the sensor 20 is provided on a virtual straight line connecting the operation surface 5 and the target F, that is, at a position in front of the operation surface 5 that is the virtual image K. The sensor 20 acquires position data including information of a position (that is, a two-dimensional position) of the target F on a plane orthogonal to the virtual straight line, and information of a distance D from the target F to the sensor 20. The sensor 20 outputs the acquired position data to the control unit 30 at a predetermined period (for example, 1/30 seconds).

For example, the sensor 20 measures a distance between the sensor 20 and respective points on an object existing in an imaging region including the target F by a time of flight (TOF) method. In the TOF method, the sensor 20 calculates flight time (that is, delay time) of light beams until reaching the sensor 20 after the light beams are reflected from the respective points on the object. In addition, the sensor 20 measures a distance between the sensor 20 and the respective points on the object from the calculated flight time and the speed of light.

The control unit 30 can communicate with the liquid crystal panel 12 and the sensor 20. For example, the control unit 30 includes a storage unit such as a central processing unit (CPU) that executes a program, a read only memory (ROM), and a random access memory (RAM), an input/output unit, and a driver. Each function of the control unit 30 is realized when the input/output unit operates under the control by the CPU, and data reading-out and data writing in the storage unit are performed. An aspect and a disposition location of the control unit 30 are not particularly limited.

For example, the control unit 30 includes a determination unit 30a that determines whether or not the operation surface 5 is operated. The determination unit 30a performs determination on the basis of the position of the target F detected by the sensor 20. The determination unit 30a determines whether or not the operation surface 5 is operated by the target F on the basis of position data input from the sensor 20. The determination unit 30a determines whether the distance D between the target F and the sensor 20 is equal to or less than a threshold value T. When determining that the distance D is equal to or less than the threshold value T, the determination unit 30a determines that the target F arrives at a virtual determination surface 6, and the operation surface 5 is operated.

When the determination unit 30a determines that the operation surface 5 is operated, for example, the above-described in-vehicle back camera operates. The determination surface 6 is a virtual plane formed at a site in which a distance from the sensor 20 is constant, and is provided at a proximity position of the operation surface 5. In this embodiment, the position of the determination surface 6 matches the position of the operation surface 5. That is, the determination surface 6 overlaps the operation surface 5. However, the position of the determination surface 6 may be a position spaced apart from the operation surface 5 by a predetermined distance.

The operation detection device 2 configured as described above sets a reference position that becomes a reference for detecting the operation on the operation surface 5 by the target F. Setting of the reference position is executed, for example, at an initial operation of the operation detection device 2, or at the time of maintenance of the operation detection device 2. The operation detection device 2 sets the reference position by bringing the target F close to the operation surface 5 displayed by the display unit 10. Hereinafter, setting of the reference position may be referred to as calibration. An execution procedure of the calibration will be described in detail with reference to FIG. 3, FIG. 4, FIG. 5, and FIG. 6.

Figure 3:
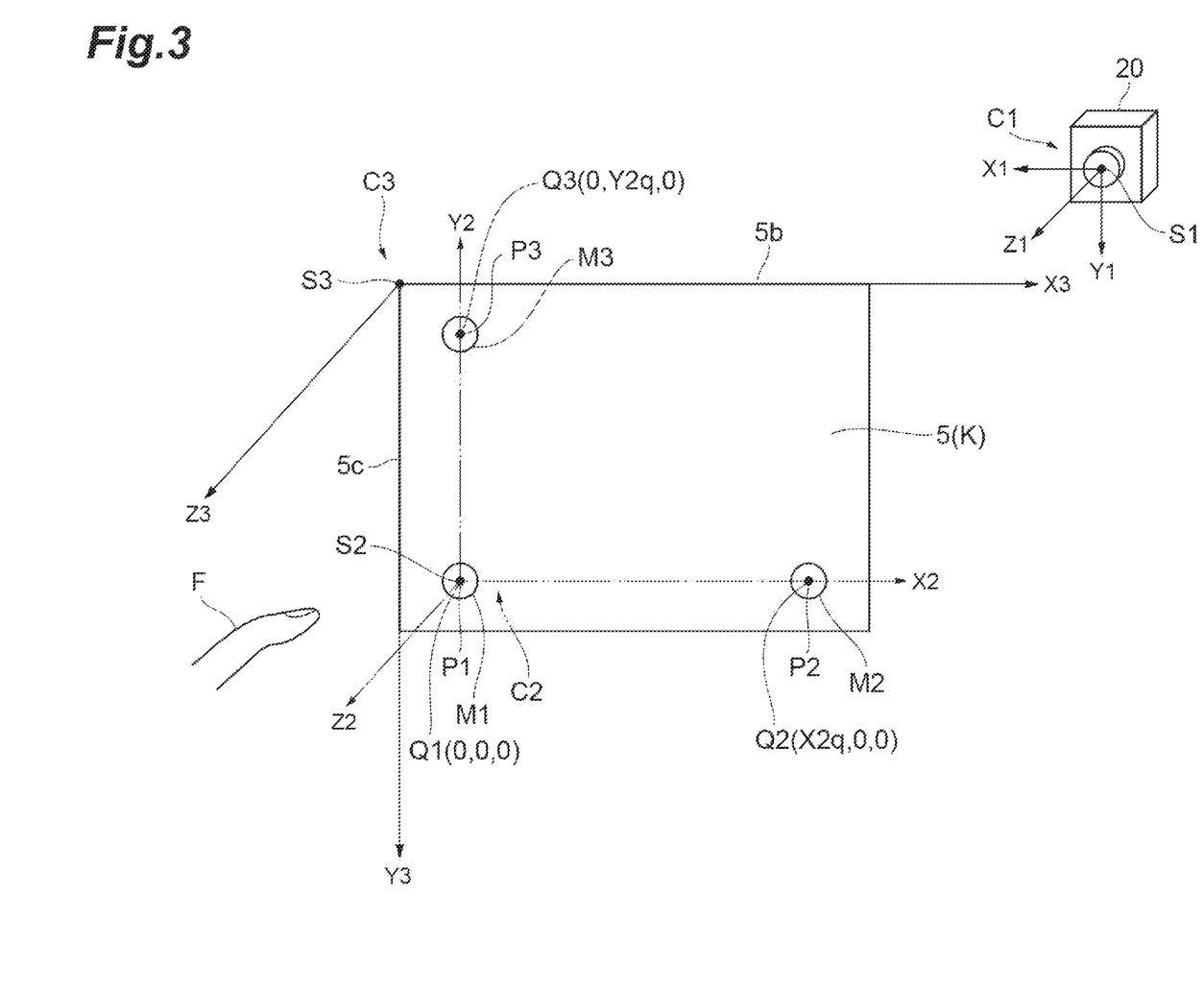
FIG. 3 is a view for describing a process of setting a reference position by the operation detection device in FIG. 1.

FIG. 3 is a view for describing a process of setting the reference position by the operation detection device 2. First, as illustrated in FIG. 3, the display unit 10 displays three markers M1, M2, and M3 on the operation surface 5 as the virtual image K. Then, a user brings the target F close to each of the three markers M1, M2, and M3 displayed on the operation surface 5. Each of the markers M1, M2, and M3 is a reference point for performing calibration, and has, for example, a circular shape. In this embodiment, a position of each of the markers M1, M2, and M3 represents a central point of each of the markers M1 M2, and M3.

The markers M1, M2, and M3 are displayed at positions which are not aligned on the same straight line in the operation surface 5. That is, the markers M1, M2, and M3 are displayed to form vertices of a triangle in the operation surface 5. In this embodiment, the markers M1, M2, and M3 are displayed to form vertices of a right triangle in the operation surface 5. The marker M1 is located at a vertex connecting two right-angled sides of the right triangle in the operation surface 5. A straight line connecting the markers M1 and M2, and a straight line connecting the markers M1 and M3 are orthogonal to each other. Hereinafter, "the markers M1, M2, and M3" may be collectively referred to as "markers M" for easy explanation.

When the target F approaches the markers M, the sensor 20 detects positions of the target F that has approached the markers M to acquire positions of the markers M as coordinate values in a sensor coordinate system C1. The sensor coordinate system C1 is an XYZ orthogonal coordinate system with a position of the sensor 20 set as a reference. The sensor coordinate system C1 has an origin S1 at the position of the sensor 20, and includes an X1-axis (first X-axis), a Y1-axis (first Y-axis), and a Z1-axis (first Z-axis) which are orthogonal to each other. The Z1-axis extends from the origin S1 toward the operation surface 5. For example, a direction in which the Z1-axis extends is a direction orthogonal to the operation surface 5. For example, directions in which the X1-axis and the Y1-axis respectively extend are directions along a plane parallel to the operation surface 5. For example, a unit of each of the X1-axis, the Y1-axis, and the Z1-axis is meter (m).

The coordinate values of the markers M in the sensor coordinate system C1 are transformed into coordinate values of the markers M in a temporary coordinate system C2, and then are transformed into coordinate values of the markers M in a screen coordinate system C3. The temporary coordinate system C2 is a virtual XYZ orthogonal system that is used in a process of transforming the coordinate values of the markers M in the sensor coordinate system C1 into the coordinate values of the markers M in the screen coordinate system C3. The temporary coordinate system C2 includes the origin S2 on the operation surface 5, and includes an X2-axis (second X-axis), a Y2-axis (second Y-axis), and a Z2-axis orthogonal to each other. For example, a position of the origin S2 is a position of one of the three markers M1, M2, and M3 displayed on the operation surface 5. In this embodiment, the position of the origin S2 of the temporary coordinate system C2 is a position of the marker M1.

The Z2-axis of the temporary coordinate system C2 extends from the origin S2 to a side opposite to the sensor 20. For example, a direction in which the Z2-axis extends is a direction orthogonal to the operation surface 5, and matches the direction in which the Z1-axis of the sensor coordinate system C1 extends. The X2-axis and the Y2-axis are located on a plane parallel to the operation surface 5. In this embodiment, a position of the parallel plane is a position overlapping the operation surface 5. The X2-axis is parallel to an X3-axis of the screen coordinate system C3 on the operation surface 5, and deviates from the X3-axis on the operation surface 5 in a direction orthogonal to the X3-axis by a predetermined distance.

The X2-axis of the temporary coordinate system C2 passes through the markers M1 and M2 on the operation surface 5. That is, the X2-axis is located on a straight line connecting the markers M1 and M2. The Y2-axis of the temporary coordinate system C2 is parallel to a Y3-axis of the screen coordinate system C3 on the operation surface 5, and deviates from the Y3-axis on the operation surface 5 in a direction orthogonal to the Y3-axis by a predetermined distance. The Y2-axis passes through the markers M1 and M3 on the operation surface 5. That is, the Y2-axis is located on a straight line connecting the markers M1 and M3.

The screen coordinate system C3 includes an origin S3 on the operation surface 5, and includes the X3-axis (third X-axis), the Y3-axis (third Y-axis), and a Z3-axis orthogonal to each other. For example, the origin S3 of the screen coordinate system C3 is located at a vertex (in FIG. 3, a vertex on an upper-left side of the operation surface 5) displayed near the marker M3 among four vertices of the rectangular operation surface 5. The vertex is a vertex connecting a long side 5b and a short side 5c of the operation surface 5. The Z3-axis extends from the origin S3 to a side opposite to the sensor 20. For example, a direction in which the Z3-axis extends is a direction orthogonal to the operation surface 5, and matches the direction in which the Z1-axis of the sensor coordinate system C1 extends and the direction in which the Z2-axis of the temporary coordinate system C2 extends. The X3-axis overlaps the long side 5b of the operation surface 5, and the Y3-axis overlaps the short side 5c of the operation surface 5.

Figure 4:
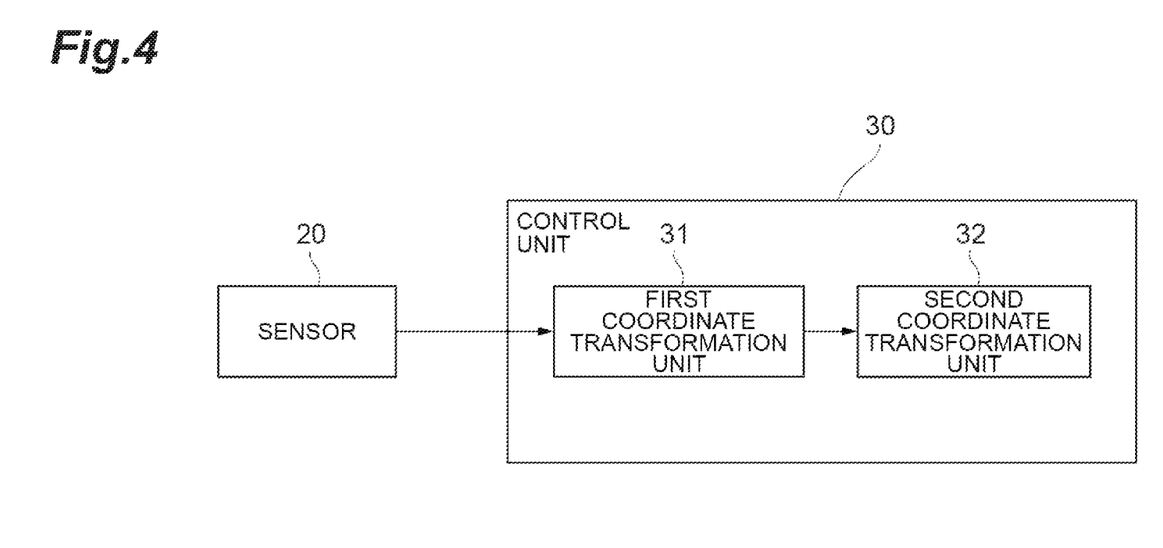
FIG. 4 is a block diagram illustrating a functional configuration of a control unit of the operation detection device in FIG. 1.

The control unit 30 performs transformation from the coordinate values of the markers M in the sensor coordinate system C1 into the coordinate values of the Markers M in the temporary coordinate system C2, and transformation from the coordinate values of the markers M in the temporary coordinate system C2 into the coordinate values of the markers M in the screen coordinate system C3. FIG. 4 is a block diagram illustrating a functional configuration of the control unit 30. As illustrated in FIG. 4, the control unit 30 includes a first coordinate transformation unit 31, and a second coordinate transformation unit 32. When receiving the coordinate values of the markers M in the sensor coordinate system C1 from the sensor 20, the first coordinate transformation unit 31 transforms the coordinate values of the markers M in the sensor coordinate system C1 into the coordinate values of the markers M in the temporary coordinate system C2. The second coordinate transformation unit 32 transforms the coordinate values of the Markers M in the temporary coordinate system C2 into the coordinate values of the markers M in the screen coordinate system C3.

Figure 5:
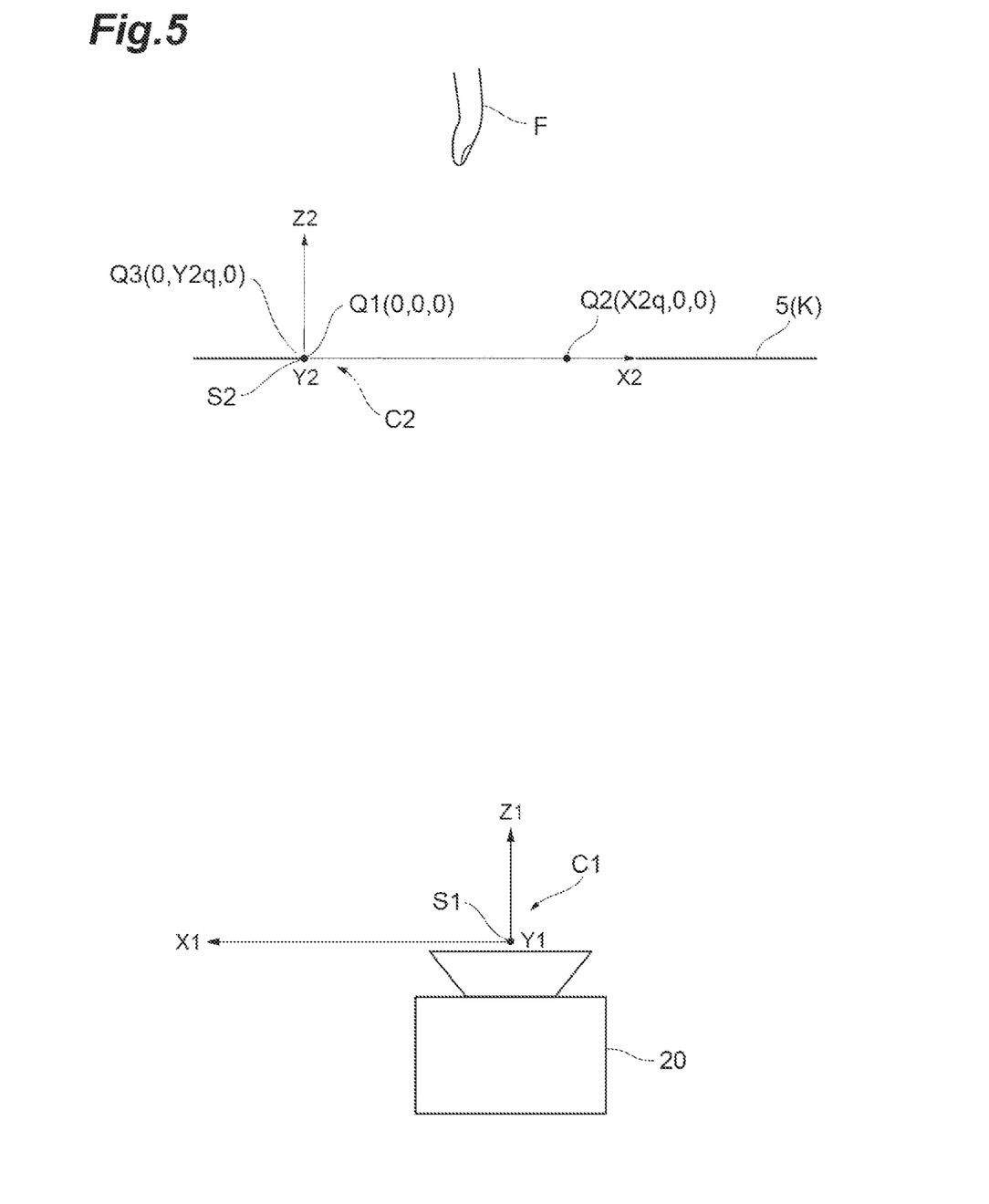
FIG. 5 is a view for describing a process of transforming a sensor coordinate system into a temporary coordinate system.

FIG. 5 is a view for describing a process of transforming the coordinate values of the markers M in the sensor coordinate system C1 into the coordinate values of the markers M in the temporary coordinate system C2. Transformation from the coordinate values of the markers M in the sensor coordinate system C1 into the coordinate values of the markers M in the temporary coordinate system C2 is performed by congruent affine transformation. By the way, the affine transformation is transformation that performs processing including rotation, parallel movement, scaling, and skew (that is, shearing) with respect to a coordinate system. Linearity is maintained before and after the affine transformation. That is, a straight line defined in a coordinate system before the affine transformation is maintained as the straight line without being bent in a coordinate system after the affine transformation. The congruent affine transformation is transformation that performs only rotation and parallel movement excluding scaling and skew in the above-described processing with respect to the coordinate system. The above-described "scaling" represents enlargement or reduction of scales of the coordinate system.

The first coordinate transformation unit 31 performs, for example, congruent affine transformation that performs only rotation and parallel movement with respect to the sensor coordinate system C1 to transform the sensor coordinate system C1 into the temporary coordinate system C2. Specifically, the first coordinate transformation unit 31 performs at least one of the parallel movement and the rotation with respect to the sensor coordinate system C1 to transform the sensor coordinate system C1 into the temporary coordinate system C2. For example, the above-described parallel movement represents movement from the origin S1 of the sensor coordinate system C1 to the origin S2 of the temporary coordinate system C2. For example, the above-described rotation represents rotation around the origin 1I of the sensor coordinate system C1 before the parallel movement or after the parallel movement. When at least one of the above-described parallel movement and rotation is performed with respect to the sensor coordinate system C1, the sensor coordinate system C1 is transformed into the temporary coordinate system C2 including the X2-axis and the Y2-axis located on a plane (in this embodiment, a plane overlapping the operation surface 5) parallel to the operation surface 5.

The congruent affine transformation from the sensor coordinate system C1 to the temporary coordinate system C2 will be described in more detail. As illustrated in FIG. 3, the coordinate values of the markers M1, M2, and M3 in the sensor coordinate system C1 are respectively set as P1, P2, and P3, and the coordinate values of the markers M1, M2, and M3 in the temporary coordinate system C2 are respectively set as Q1, Q2, and Q3. Components of the coordinate values P1, P2, and P3 in the sensor coordinate system C1 are acquired by detecting the target F by the sensor 20. Components of the coordinate values Q1, Q2, and Q3 in the temporary coordinate system C2 are obtained from the components of the coordinate values P1, P2, and P3.

In this embodiment, since the origin S2 of the temporary coordinate system C2 is located at the marker M1, components of the coordinate value Q1 corresponding to the marker M1 are expressed as (0, 0, 0). Since the X2-axis of the temporary coordinate system C2 passes through the marker M2, components of the coordinate value Q2 are expressed as $(X2_q, 0, 0)$ when a component of the X2-axis of the coordinate value Q2 corresponding to the marker M2 is set as $X2_q$. Since the Y2-axis of the temporary coordinate system C2 passes through the marker M3, components of the coordinate value Q3 are expressed as $(0, Y2_q, 0)$ when a component of the Y2-axis of a coordinate value Q3 corresponding to the marker M3 is set as $Y2_q$.

The first coordinate transformation unit 31 Obtains unknown $X2_q$ and $Y2_q$ from a positional relationship between the coordinate values P1, P2, and P3 in the sensor coordinate system C1. Specifically, the first coordinate transformation unit 31 obtains $X2_q$ by using the following Expression (1), and obtains $Y2_q$ by using the following Expression (2).

[Mathematical Formula 1]

$$X2_q = |\overline{P1P2}| \tag{1}$$

[Mathematical Formula 2]

$$Y2_q = |\overline{P1P3}| \tag{2}$$

The first coordinate transformation unit 31 obtains components of the coordinate values Q2 and Q3 in the temporary coordinate system C2 by obtaining X2$_q$ and Y2$_q$. When the coordinate values P1, P2, and P3 in the sensor coordinate system C1 before transformation, and the coordinate values Q1, Q2, and Q3 in the temporary coordinate system C2 after transformation are obtained, a transformation coefficient matrix (details will be described later) for performing the congruent affine transformation from the sensor coordinate system C1 into the temporary coordinate system C2 can be obtained. The first coordinate transformation unit 31 transforms the coordinate values P1, P2, and P3 in the sensor coordinate system C1 into the coordinate values Q1, Q2, and Q3 in the temporary coordinate system C2 by obtaining the transformation coefficient matrix.

Figure 6:
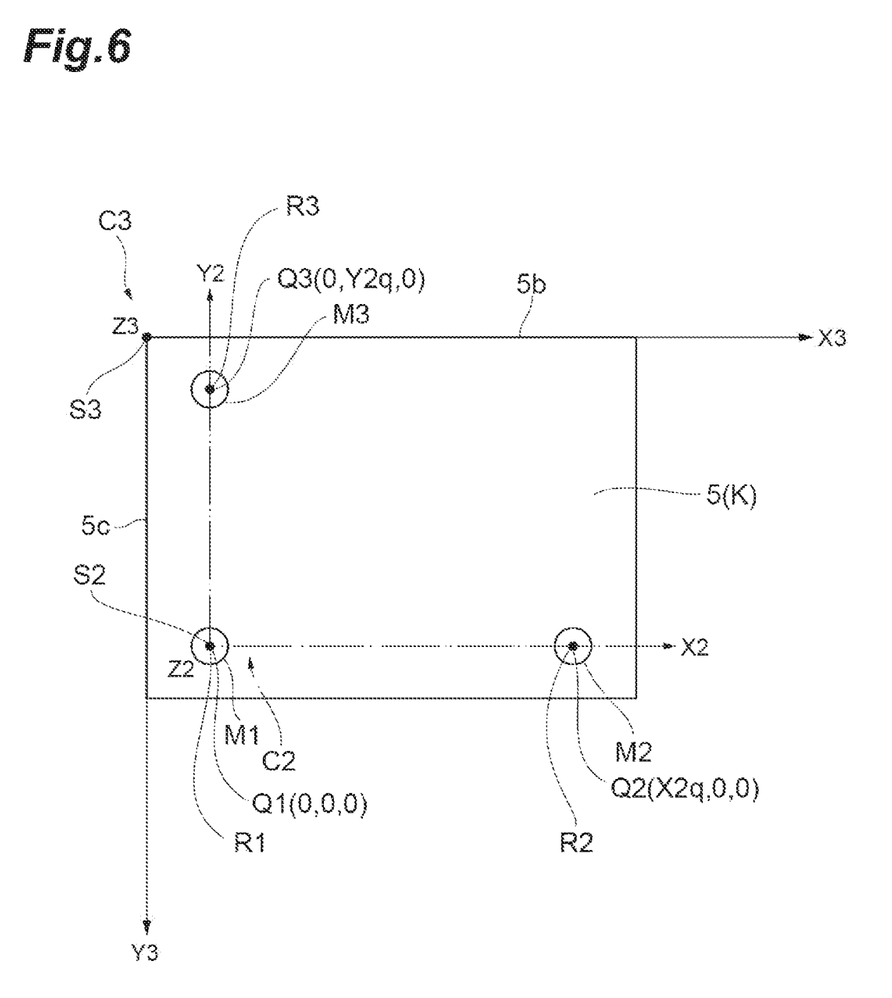
FIG. 6 is a view for describing a process of transforming the temporary coordinate system into a screen coordinate system.

FIG. 6 is a view for describing a process of transforming the coordinate values Q1, Q2, and Q3 of the markers M1, M2, and M3 in the temporary coordinate system C2 into coordinate values R1, R2, and R3 of the markers M1, M2, and M3 in the screen coordinate system C3. Due to the congruent affine transformation by the first coordinate transformation unit 31, the sensor coordinate system C1 is transformed into the temporary coordinate system C2 including the X2-axis and the Y2-axis located on the operation surface 5. As a result, the origin S2 of the temporary coordinate system C2 and the origin S3 of the screen coordinate system C3 are located on the operation surface 5 in combination. Accordingly, it is not necessary to perform the parallel movement in a direction in which the Z2-axis extends with respect to the temporary coordinate system C2 so as to transform the temporary coordinate system C2 into the screen coordinate system C3, and it is also not necessary to preform scaling of the Z2-axis.

However, the X2-axis and the Y2-axis of the temporary coordinate system C2 respectively deviate from the X3-axis and the Y3-axis of the screen coordinate system C3 on the operation surface 5. Accordingly, in order to transform the temporary coordinate system C2 into the screen coordinate system C3, it is necessary to match the positions of the X2-axis and the Y2-axis and the positions of the X3-axis and the Y3-axis in the screen coordinate system C3 with each other. In addition, in order to match a scale of the X2-axis and a scale of the Y2-axis with a scale of the X3-axis and a scale of the Y3-axis, respectively, it is necessary to perform scaling of the X2-axis and the Y2-axis.

Here, with respect to the temporary coordinate system C2, the second coordinate transformation unit 32 performs movement in a direction parallel to a plane including the X2-axis and the Y2-axis, and scaling of the temporary coordinate system C2 to transform the temporary coordinate system C2 into the screen coordinate system C3. For example, in a case where components of the coordinate value R1 are (100, 300, 0), and components of the coordinate value R2 are (700, 300, 0), transformation from X2 including components (X2$_q$, 0, 0) of the coordinate value Q2 into X3 is performed by using the following Expression (3), when a value on the X2-axis of the temporary coordinate system C2 is set as X2, and a value on the X3-axis of the screen coordinate system C3 is set as X3.

[Mathematical Formula 3]

$$X3 = \frac{(700-100)}{X_{q2}} X2 + 100 \quad (3)$$

Transformation from the Y2-axis of the temporary coordinate system C2 into the Y3-axis of the screen coordinate system C3 is also performed in a similar manner. In this manner, the second coordinate transformation unit 32 transforms the coordinate values Q1, Q2, and Q3 in the temporary coordinate system C2 into the coordinate values R1, R2, and R3 in the screen coordinate system C3.

Figure 7:
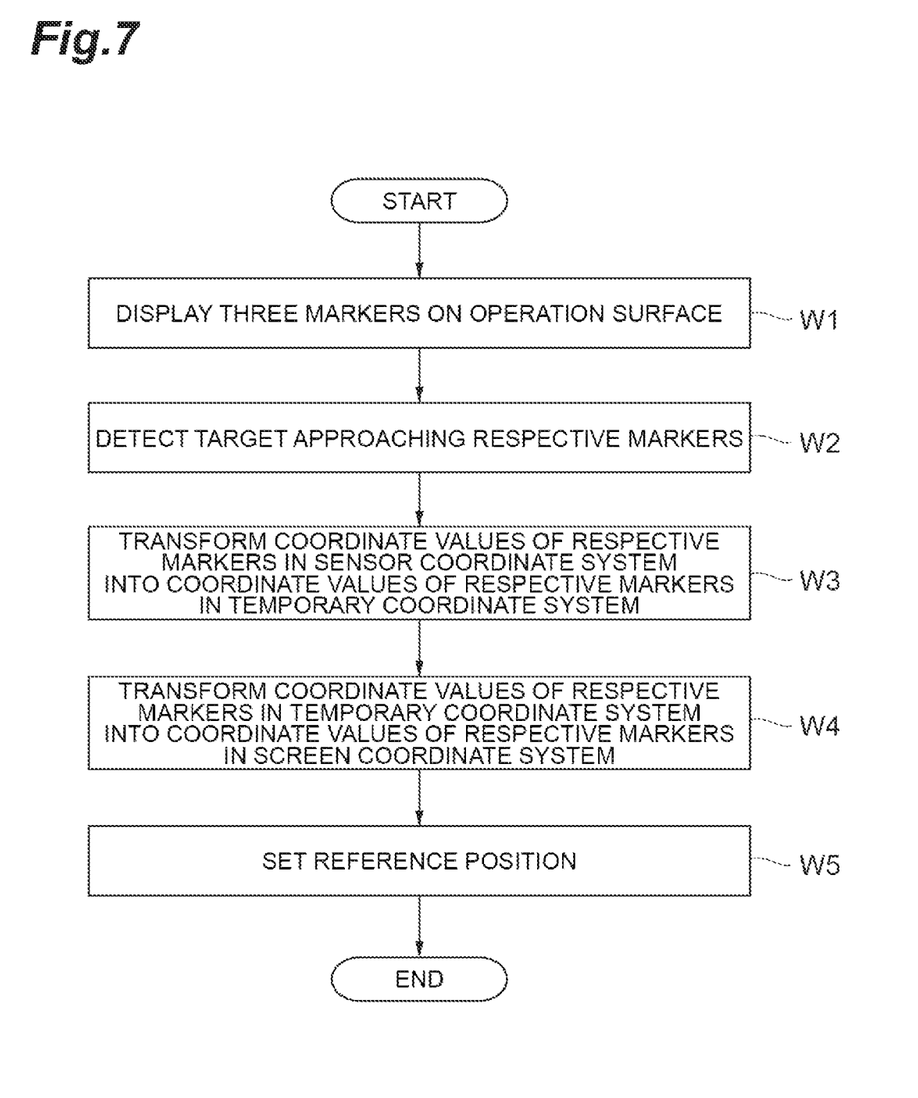
FIG. 7 is a flowchart illustrating an example of a reference position setting method according to another embodiment.

Next, the reference position setting method according to this embodiment will be described with reference to FIG. 7. FIG. 7 is a flowchart illustrating an example of the reference position setting method according to this embodiment. The reference position setting method is performed by using the operation detection device 2. First, the display unit 10 displays three markers M1, M2, and M3 on the operation surface 5 (process W1). At this time, the display unit 10 displays the three markers M1, M2, and M3 on the operation surface 5 to form vertices of a triangle (refer to FIG. 3). Then, a user brings the target F such as a finger close to each of the three markers M1, M2, and M3.

When the target F approaches the markers M, the sensor 20 detects the target F (process W2). Specifically, the sensor 20 detects position data including the distance D between the sensor 20 and the target F, and outputs the position data to the control unit 30 (refer to FIG. 2). When the control unit 30 receives the position data output from the sensor 20, the determination unit 30a determines whether or not the distance D is equal to or less than the threshold value T. The determination unit 30a recognizes approaching of the target F to the markers M when determining that the distance D is equal to or less than the threshold value T. Detection of the target F by the sensor 20 is performed in accordance with recognition of approaching of the target F to the markers M by the determination unit 30a. When the sensor 20 detects the target F, the control unit 30 acquires the coordinate values P1, P2, and P3 of the markers M1, M2, and M3 in the sensor coordinate system C1 which are included in the position data output from the sensor 20.

When the control unit 30 acquires the coordinate values P1, P2, and P3 in the sensor coordinate system C1, the first coordinate transformation unit 31 transforms the coordinate values P1, P2, and P3 in the sensor coordinate system C1 into the coordinate values Q1, Q2, and Q3 in the temporary coordinate system C2 (process W3). Specifically, the first coordinate transformation unit 31 performs the congruent of affine transformation that performs only rotation and parallel movement with respect to the sensor coordinate system C1 to transform the coordinate values P1, P2, and P3 in the sensor coordinate system C1 into the coordinate values Q1, Q2, and Q3 in the temporary coordinate system C2.

In this embodiment, as illustrated in FIG. 5, the first coordinate transformation unit 31 performs parallel movement and rotation with respect to the sensor coordinate system C1. When the first coordinate transformation unit 31 performs the above-described parallel movement and rotation, the sensor coordinate system C1 is transformed into the temporary coordinate system C2 including the X2-axis and the Y2-axis located on a plane (in this embodiment, a plane overlapping the operation surface 5) parallel to the operation surface 5.

Next, the second coordinate transformation unit 32 transforms the coordinate values Q1, Q2, and Q3 in the temporary coordinate system C2 into the coordinate values R1, R2, and R3 in the screen coordinate system C3 (process W4). Specifically, with respect to the temporary coordinate system C2, the second coordinate transformation unit 32 performs movement in a direction parallel to a plane including the X2-axis and the Y2-axis, and scaling of the temporary coordinate system C2 to transform the coordinate values Q1, Q2, and Q3 in the temporary coordinate system C2 into the coordinate values R1, R2, and R3 in the screen coordinate system C3.

As described above, the first coordinate transformation unit 31 transforms the coordinate values P1, P2, and P3 in the sensor coordinate system C1 into the coordinate values Q1, Q2, and Q3 in the temporary coordinate system C2, and the second coordinate transformation unit 32 transforms the coordinate values Q1, Q2, and Q3 in the temporary coordinate system C2 into the coordinate values R1, R2, and R3 in the screen coordinate system C3. As a result, the coordinate values P1, P2, and P3 in the sensor coordinate system C1, and the coordinate values R1, R2, and R3 in the screen coordinate system C3 are associated with each other, and thus a reference position for determining coordinate values of respective positions placed on the operation surface 5 are set (process W5). Then, a series of processes are completed, and the calibration is completed. When the calibration is completed, the operation detection device 2 can be used to cause respective devices to operate.

Next, an operational effect of the reference position setting method and the operation detection device 2 according to this embodiment will be described in combination with a problem in the affine transformation. In the case of performing the affine transformation with respect to an arbitrary XYZ orthogonal coordinate system, the affine transformation from the coordinate value P into the coordinate value Q is expressed by the following Expression (4), when components of the coordinate value P before the affine transformation are set as (Xp, Yp, Zp), and components of the coordinate value Q after the affine transformation are set as (Xq, Yq, Zq).

[Mathematical Formula 4]

$$\begin{bmatrix} X_q \\ Y_q \\ Z_q \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} X_p \\ Y_p \\ Z_p \end{bmatrix} + \begin{bmatrix} b_1 \\ b_2 \\ b_3 \end{bmatrix} \quad A = \begin{bmatrix} a_{11} & a_{12} & a_{13} \\ a_{21} & a_{22} & a_{23} \\ a_{31} & a_{32} & a_{33} \end{bmatrix}, \quad (4)$$

$$b = \begin{bmatrix} b_1 \\ b_2 \\ b_3 \end{bmatrix}$$

In Expression (4), b is a transformation coefficient matrix representing parallel movement of the XYZ orthogonal coordinate system, and A is a transformation coefficient matrix representing rotation, scaling, and skew of the XYZ orthogonal coordinate system. In order to perform the affine transformation from the coordinate value P into the coordinate value Q, it is necessary to obtain respective coefficients ($a_{11}$, $a_{12}$, $a_{13}$, $a_{21}$, $a_{22}$, $a_{23}$, $a_{31}$, $a_{32}$, and $a_{33}$) of the transformation coefficient matrix A, and respective coefficients ($b_1$, $b_2$, and $b_3$) of the transformation coefficient matrix b.

With regard to an X-axis, a Y-axis, and a Z-axis of the XYZ orthogonal coordinate system, four unknowns (that is, three coefficients of the transformation coefficient matrix A, and one coefficient of the transformation coefficient matrix b) exist. Accordingly, when four sets of combination of the coordinate value P and the coordinate value Q are present, all of the unknowns relating to the X-axis, the Y-axis, and the Z-axis can be obtained. That is, when acquiring four coordinate values P before the affine transformation, and four coordinate values Q after the affine transformation, the transformation coefficient matrices A and b can be obtained. It is conceivable to perform the calibration by using the affine transformation. For example, it is considered that four markers as a reference are displayed on the same plane, and respective coordinate values P representing positions of the respective markers in an arbitrary coordinate system are affine-transformed into respective coordinate values Q representing positions of respective markers in an additional coordinate system to perform association between the respective coordinate values P and the respective coordinate values Q.

However, even when performing the affine transformation from four coordinate values P located on the same plane (for example, a plane including an X-axis and a Y-axis of an arbitrary coordinate system) into four coordinate values Q, components of the Z-axis become the same as each other, and thus conditions for obtaining unknowns relating to each of the X-axis, the Y-axis, and the Z-axis become deficient. Accordingly, it is difficult to obtain the transformation coefficient matrices A and b. Accordingly, as described above, even when directly performing the affine transformation from the sensor coordinate system C1 into the screen coordinate system C3, it is difficult to obtain the transformation coefficient matrices A and b, and thus it is difficult to directly transform the sensor coordinate system C1 into the screen coordinate system C3.

In contrast, in the reference position setting method and the operation detection device 2 according to this embodiment, at least one of parallel movement and rotation is performed with respect to the sensor coordinate system C1 to perform congruent affine transformation from the sensor coordinate system C1 into the temporary coordinate system C2. In addition, with respect to the temporary coordinate system C2, movement in a direction parallel to a plane including the X2-axis and the Y2-axis, and scaling of the temporary coordinate system C2 are performed to transform the temporary coordinate system C2 into the screen coordinate system C3. That is, in each of the process W3 of transforming the sensor coordinate system C1 into the temporary coordinate system C2, and the process W4 of transforming the temporary coordinate system C2 into the screen coordinate system C3, a process of performing rotation of the coordinate system and a process of performing scaling of the coordinate system are performed, respectively.

In this manner, when performing scaling and the like by using Expression (3) described above after performing transformation from the sensor coordinate system C1 into the temporary coordinate system C2 by the congruent affine transformation, transformation from the temporary coordinate system C2 into the screen coordinate system C3 becomes possible. That is, when performing two-stage transformation including transformation from the sensor coordinate system C1 into the temporary coordinate system C2 and transformation from the temporary coordinate system C2 into the screen coordinate system C3, transformation into the screen coordinate system C3 that becomes a reference of an operation on the operation surface 5 becomes possible.

As described above, since the coordinate values R1, R2, and R3 in the screen coordinate system C3 are obtained from the coordinate values P1, P2, and P3 in the sensor coordinate system C1, another measurement instrument for actually measuring the coordinate values R1, R2, and R3 in the screen coordinate system C3 is not necessary when performing the calibration. That is, in this embodiment, only the sensor 20 is the measurement instrument for performing the calibration. Accordingly, a device configuration can be simplified.

As an example in the case of using another measurement instrument, a method of actually measuring the coordinate values R1, R2, and R3 in the screen coordinate system C3 by using a ruler, and of writing the coordinate values R1, R2, and R3 in a program as an integer is considered. However, due to a normal measurement error in actual measurement of the coordinate values R1, R2, and R3 in the screen coordinate system C3, or the like, a positional relationship of the markers M1, M2, and M3 may be distorted before and after the coordinate system transformation.

As another factor that the positional relationship of the markers M1, M2, and M3 is distorted, an accuracy difference that occurs between a length in the X1-axis and a length in the Y1-axis in the sensor coordinate system C1 is considered. The operation surface 5 on which the markers M1, M2, and M3 are displayed is displayed by the AI plate 11. When the AI plate 11 displays the operation surface 5, vector transformation by scaling and skew may be performed with respect to the operation surface 5.

Even under the condition, according to the reference position setting method and the operation detection device 2 according to this embodiment, since the coordinate values R1, R2, and R3 in the screen coordinate system C3 are obtained from the coordinate values P1, P2, and P3 in the sensor coordinate system C1, the positional relationship of the markers M1, M2, and M3 before and after the coordinate system transformation is not distorted. That is, the transformation coefficient matrices A and b which are used in the coordinate system transformation can be obtained with accuracy. Accordingly, the coordinate values P1, P2, and P3 in the sensor coordinate system C1 can be transformed into the coordinate values R1, R2, and R3 in the screen coordinate system C3 with accuracy, and the calibration can be performed with accuracy.

A case where resolution in a longitudinal direction (that is, a direction in which the X3-axis of the screen coordinate system C3 extends) of the operation surface 5 and resolution in a lateral direction (that is, a direction in which the Y3-axis of the screen coordinate system C3 extends) are different from each other is also considered. However, according to the reference position setting method and the operation detection device 2 according to this embodiment, even in a case where a difference in the resolution exists, the positional relationship of the markers M1, M2, and M3 is not distorted.

In this embodiment, the coordinate value P1 of the marker M1 in the sensor coordinate system C1 is set as the origin S2 of the temporary coordinate system C2. Accordingly, a component of the coordinate value P1 of the marker M1 in the temporary coordinate system C2 becomes zero. According to this, it is possible to reduce a processing load in accordance with transformation from the sensor coordinate system C1 into the temporary coordinate system C2, and a processing load in accordance with transformation from the temporary coordinate system C2 into the screen coordinate system C3.

In this embodiment, the coordinate value P2 of the marker M2 in the sensor coordinate system C1 is set as the coordinate value Q2 on the X2-axis of the temporary coordinate system C2, and the coordinate value P3 of the marker M3 in the sensor coordinate system C1 is set as the coordinate value Q3 on the Y2-axis of the temporary coordinate system C2. Accordingly, components of the Y2-axis and the Z2-axis of the coordinate value Q2 in the temporary coordinate system C2 become zero, respectively. In addition, components of the X2-axis and the Z2-axis of the coordinate value Q3 in the temporary coordinate system C2 become zero, respectively. According to this, it is possible to reduce the processing load in accordance with transformation from the sensor coordinate system C1 into the temporary coordinate system C2, and the processing load in accordance with transformation from the temporary coordinate system C2 into the screen coordinate system C3, respectively.

Hereinbefore, description has been given of an embodiment of the reference position setting method and the operation detection device according to the present disclosure. However, the present disclosure is not limited to the above-described embodiment, and may be modified or applied to another configuration within a range not departing from the gist described in the appended claims. For example, the content and procedure of the processes of the reference position setting method, and configuration of respective parts of the operation detection device can be appropriately modified within a range not departing from the gist of the appended claims.

For example, in the above-described embodiment, description has been given of an example in which the three markers M1, M2, and M3 having a circular shape are displayed. However, the number of the markers may be greater than three. The shape of the markers is not particularly limited. For example, the shape of the markers may be a polygonal shape such as a triangular shape, a square shape, a hexagonal shape, or an octagonal shape, or an elongated circular shape such as an elliptical shape.

In the above-described embodiment, description has been given of an example in which the sensor coordinate system C1, the temporary coordinate system C2, and the screen coordinate system C3 are orthogonal coordinate systems. However, it is not necessary for the X1-axis, the Y1-axis, and the Z1-axis of the sensor coordinate system C1 to be orthogonal to each other, and the axes may intersect each other. Similarly, the X2-axis, the Y2-axis, and the Z2-axis of the temporary coordinate system C2 may intersect each other, and the X3-axis, the Y3-axis, and the Z3-axis of the screen coordinate system C3 may intersect each other. In the above-described embodiment, description has been given of an example in which the direction in which the Z1-axis of the sensor coordinate system C1 extends is a direction orthogonal to the operation surface 5. However, the direction in which the Z1-axis extends may be a direction inclined with respect to a direction orthogonal to the operation surface 5. Directions in which the X1-axis and the Y1-axis of the sensor coordinate system C1 extend may be directions intersecting the operation surface 5.

In the above-described embodiment, description has been given of an example in which the position of the origin S2 of the temporary coordinate system C2 is the position of the marker M1. However, the position of the origin S2 may be a position other than the marker M1 on the operation surface 5, and may be a position other than the operation surface 5. In the above-described embodiment, description has been given of an example in which the direction in which the Z2-axis of the temporary coordinate system C2 extends is a direction orthogonal to the operation surface 5 and matches the direction in which the Z1-axis of the sensor coordinate system C1 extends. However, the direction in which the Z2-axis of the temporary coordinate system C2 extends may be direction inclined with respect to a direction orthogonal to the operation surface 5.

In the above-described embodiment, description has been given of an example in which the X2-axis and the Y2-axis of the temporary coordinate system C2 are located on a plane parallel to the operation surface 5, and a position of the parallel plane is a position overlapping the operation surface 5. However, the position of the parallel plane may be a position deviating from the operation surface 5. That is, it is not necessary for the X2-axis and the Y2-axis to be located on the operation surface 5, and the axes may deviate from the operation surface 5 to a direction in which the Z2-axis extends.

In the above-described embodiment, description has been given of an example in which the X2-axis of the temporary coordinate system C2 deviates from the X3-axis of the screen coordinate system C3 in a direction orthogonal to the X3-axis by a predetermined distance on the operation surface 5. However, the X2-axis may overlap the X3-axis, and may pass through a position other than the markers M1 and M2 on the operation surface 5. Similarly, the Y2-axis of the temporary coordinate system C2 may overlap the Y3-axis of the screen coordinate system C3, and may pass through a position other than the markers M1 and M3 on the operation surface 5.

In the above-described embodiment, description has been given of an example in which the direction in which the Z3-axis of the screen coordinate system C3 extends is, for example, a direction orthogonal to the operation surface 5, and Matches the direction in which the Z1-axis of the sensor coordinate system C1 extends and the direction in which the Z2-axis of the temporary coordinate system C2 extends. However, the direction in which the Z3-axis extends may be a direction inclined with respect to a direction orthogonal to the operation surface 5.

In the above-described embodiment, description has been given of an example in which the aerial imaging element is the AI plate 11 that images an image in the air. However, for example, the aerial imaging element may be a three-dimensional imaging element such as a hologram that images a three-dimensional virtual image in front of a user when viewed from the user, or may be an element other than the AI plate.

In the above-described embodiment, description has been given of the operation detection device 2 including the display unit 10, the sensor 20, and the control unit 30. However, the kind, the shape, the size, the number, the material, and the arrangement aspect of the display unit, the sensor, and the control unit can be appropriately changed. For example, in the above-described embodiment, description has been given of the sensor 20 that is a depth sensor configured to detect the distance D from the target F. However, the operation detection device may include a sensor other than the depth sensor. That is, the operation detection device may include an infrared sensor, an ultrasonic sensor, or the like instead of the sensor, and the kind of the sensor can be appropriately changed.

In the above-described embodiment, description has been given of an example in which the sensor 20 measures the distance between the sensor 20 and respective points on an object by the TOF method. However, a method of measuring the distance between the sensor and respective points on the object is not limited to the TOF method. For example, the sensor may measure the distance between the sensor and respective points on the object by a light coding method. In the light coding method, the sensor irradiates respective points on the object existing within an imaging region including the target with light beams in a random dot pattern. Then, the sensor receives the light beams reflected from the respective points on the object, and detects deformation of the pattern of the reflected light beams to measure the distance between the sensor and the respective points on the object.

The operation detection device may be mounted on an apparatus other than a vehicle. In addition, the operation detection device may be a device that displays an operation surface for causing respective devices other than the vehicle to operate as a virtual image. The reference position setting method and the operation detection device are also applicable to various apparatuses other than the vehicle. The reference position setting method may be carried out by using a device other than the operation detection device.

REFERENCE SIGNS LIST

1: display apparatus, 2: operation detection device, 3: image display device, 5: operation surface, 10: display unit, 20: sensor, 30: control unit, 31: first coordinate transformation unit, 32: second coordinate transformation unit, C1: sensor coordinate system, C2: temporary coordinate system, C3: screen coordinate system, F: target, K: virtual image, M1, M2, M3: marker, P1, P2, P3, Q1, Q2, Q3, R1, R2, R3: coordinate value, S1, S2, S3: origin, X1-axis: first X-axis, X2-axis: second X-axis, X3-axis: third X-axis, Y1-axis: first Y-axis, Y2-axis: second Y-axis, Y3-axis: third Y-axis, Z1-axis: first Z-axis.

The invention claimed is:

1. A reference position setting method of setting a reference position for detecting an operation on an operation surface displayed as a virtual image, the method comprising:
   providing a display that displays the operation surface;
   a process of displaying at least three markers on the operation surface in such a manner that the at least three markers form vertices of a triangle;
   a process of acquiring coordinate values of the markers in a sensor coordinate system including a first Z-axis extending from a sensor toward the operation surface, and a first X-axis and a first Y-axis intersecting the first Z-axis, by the sensor detecting a target approaching the markers;
   a process of transforming the coordinate values acquired in the acquisition process into coordinate values in a temporary coordinate system including a second X-axis and a second Y-axis intersecting each other on a plane parallel to the operation surface; and
   a process of transforming the coordinate values transformed in the transformation process into coordinate values in a screen coordinate system including a third X-axis and a third Y-axis extending in directions parallel to the second X-axis and the second Y-axis on the operation surface, respectively,
   wherein in the transformation process into the coordinate values in the temporary coordinate system,
   at least one of parallel movement and rotation is performed with respect to the sensor coordinate system to transform the sensor coordinate system into the temporary coordinate system, and
   in the transformation process into the coordinate value in the screen coordinate system,
   movement of the temporary coordinate system in a direction parallel to a plane including the second X-axis and the second Y-axis, and enlargement or reduction of the temporary coordinate system are performed to transform the temporary coordinate system into the screen coordinate system, and
   obtaining the coordinate value in the screen coordinate system by using no more than three of the at least three markers in a state in which the operation surface is tilted with respect to a Z-axis of the display, wherein the Z-axis of the display is oriented perpendicular to a surface of the display.

2. The reference position setting method according to claim 1, wherein in the transformation process into the coordinate value in the temporary coordinate system,
a coordinate value of one marker among the at least three markers in the sensor coordinate system is set as the origin of the temporary coordinate system.

3. The reference position setting method according to claim 1,
wherein in the transformation process into the coordinate values in the temporary coordinate system,
a coordinate value of one marker among the at least three markers in the sensor coordinate system is set as a coordinate value on the second X-axis of the temporary coordinate system, and a coordinate value of another one marker among the at least three markers in the sensor coordinate system is set as a coordinate value on the second Y-axis of the temporary coordinate system.

4. An operation detection device configured to set a reference position for detecting an operation on an operation surface displayed as a virtual image, the device comprising:
a display configured to display at least three markers on the operation surface in such a manner that the at least three markers form vertices of a triangle;
a sensor configured to acquire coordinate values of the markers in a sensor coordinate system including a first Z-axis extending toward the operation surface, and a first X-axis and a first Y-axis intersecting the first Z-axis, by detecting a target approaching the markers;
a first coordinate transformer configured to transform coordinate values of the markers in the sensor coordinate system into coordinate values in a temporary coordinate system including a second X-axis and a second Y-axis intersecting each other on a plane parallel to the operation surface; and
a second coordinate transformer configured to transform the coordinate values of the markers in the temporary coordinate system into coordinate values in a screen coordinate system including a third X-axis and a third Y-axis extending in directions parallel to the second X-axis and the second Y-axis on the operation surface, respectively,
wherein the first coordinate transformer performs at least one of parallel movement and rotation with respect to the sensor coordinate system to transform the sensor coordinate system into the temporary coordinate system, and
the second coordinate transformer performs movement of the temporary coordinate system in a direction parallel to a plane including the second X-axis and the second Y-axis, and enlargement or reduction of the temporary coordinate system to transform the temporary coordinate system into the screen coordinate system, wherein
a Z-axis of the is oriented perpendicular to a surface of the display, and
in a state in which the operation surface is tilted with respect to the Z-axis of the display, the coordinate values in the screen coordinate system are obtained using no more than three of the at least three markers.

* * * * *

UNITED STATES PATENT AND TRADEMARK OFFICE
CERTIFICATE OF CORRECTION

| | | |
|---|---|---|
| PATENT NO. | : 11,662,860 B2 | |
| APPLICATION NO. | : 17/601562 | |
| DATED | : May 30, 2023 | |
| INVENTOR(S) | : Takayoshi Mochizuki | |

It is certified that error appears in the above-identified patent and that said Letters Patent is hereby corrected as shown below:

In the Claims

Column 20, Line 23 (Claim 4), please change "the is" to -- the display is --.

Signed and Sealed this
Twenty-first Day of November, 2023

Katherine Kelly Vidal
*Director of the United States Patent and Trademark Office*